(12) United States Patent
Harrington

(10) Patent No.: US 7,343,813 B1
(45) Date of Patent: Mar. 18, 2008

(54) MULTICAPACITOR SENSOR ARRAY

(76) Inventor: Richard H. Harrington, 5575 Dexter Town Hall Rd., Dexter, MI (US) 48130-9566

( * ) Notice: Subject to any disclaimer, the term of this patent is extended or adjusted under 35 U.S.C. 154(b) by 0 days.

(21) Appl. No.: 11/355,052

(22) Filed: Feb. 15, 2006

Related U.S. Application Data

(60) Provisional application No. 60/652,864, filed on Feb. 15, 2005.

(51) Int. Cl.
*G01N 3/24* (2006.01)
*G01L 1/00* (2006.01)

(52) U.S. Cl. .......................................... 73/780; 73/841
(58) Field of Classification Search ................ 73/780
See application file for complete search history.

(56) References Cited

U.S. PATENT DOCUMENTS

| | | | |
|---|---|---|---|
| 4,243,969 A * | 1/1981 | Steigerwald et al. ......... 338/309 |
| 4,951,510 A * | 8/1990 | Holm-Kennedy et al. ...................... 73/862.041 |
| 5,543,591 A * | 8/1996 | Gillespie et al. .......... 178/18.03 |
| 6,483,480 B1 * | 11/2002 | Sievenpiper et al. ........ 343/909 |
| 6,509,620 B2 * | 1/2003 | Hartwell et al. ............. 257/415 |
| 6,812,903 B1 * | 11/2004 | Sievenpiper et al. ........ 343/753 |
| 7,075,317 B2 * | 7/2006 | Berting et al. .............. 324/690 |
| 2003/0133372 A1 * | 7/2003 | Fasen et al. ................... 369/43 |
| 2005/0005703 A1 * | 1/2005 | Saito et al. .................... 73/780 |

OTHER PUBLICATIONS

Akasofu, Ken-Ichi and Neuman, Michael R. "A thin-film variable capacitance shear force sensor for medical and robotics applications", Annual International Conference of the IEEE Engineering in Medicine and Biology Society. vol. 13, No. 4, 1991. Published Oct. 31-Nov. 3, 1991; pp. 1601-1602.*

Chase, Troy A. and Luo, Ren C. "A thin-film flexible capacitive tactile normal/shear force array sensor", Industrial Electronics, Control and Instrumentation, 1995; Proceedings of the 1995 IEEE IECON 21st International Conference on. vol. 2. Published Nov. 6-10, 1995; pp. 1196-1201.*

* cited by examiner

*Primary Examiner*—Edward Lefkowitz
*Assistant Examiner*—Jonathan Dunlap
(74) *Attorney, Agent, or Firm*—Barbara M. Burns

(57) ABSTRACT

A new capacitive sensor array comprises a first plurality of conductors separated by a compressible insulator from a second plurality of conductors lying in a second plane parallel to the first plane. The second plurality of conductors are paired to partially overlap the first plurality of conductors, two by one in sets, whereby a shear force applied in a plane parallel to the conductor array will cause capacitance between the first and second conductors to change. Serially sampling the two by one sets for changes in capacitance provides information on both the magnitude and direction of shear. Moreover, forces applied perpendicular to the planes causes the insulator to compress, thus also changing the capacitances of the two by one sets of the sensor array. In the preferred embodiment, the imbalance of voltages between the paired conductors is applied to a differential amplifier to sense shear magnitude and direction. Compression force appears as an increase in peak voltage magnitude in both of the paired conductors.

5 Claims, 3 Drawing Sheets

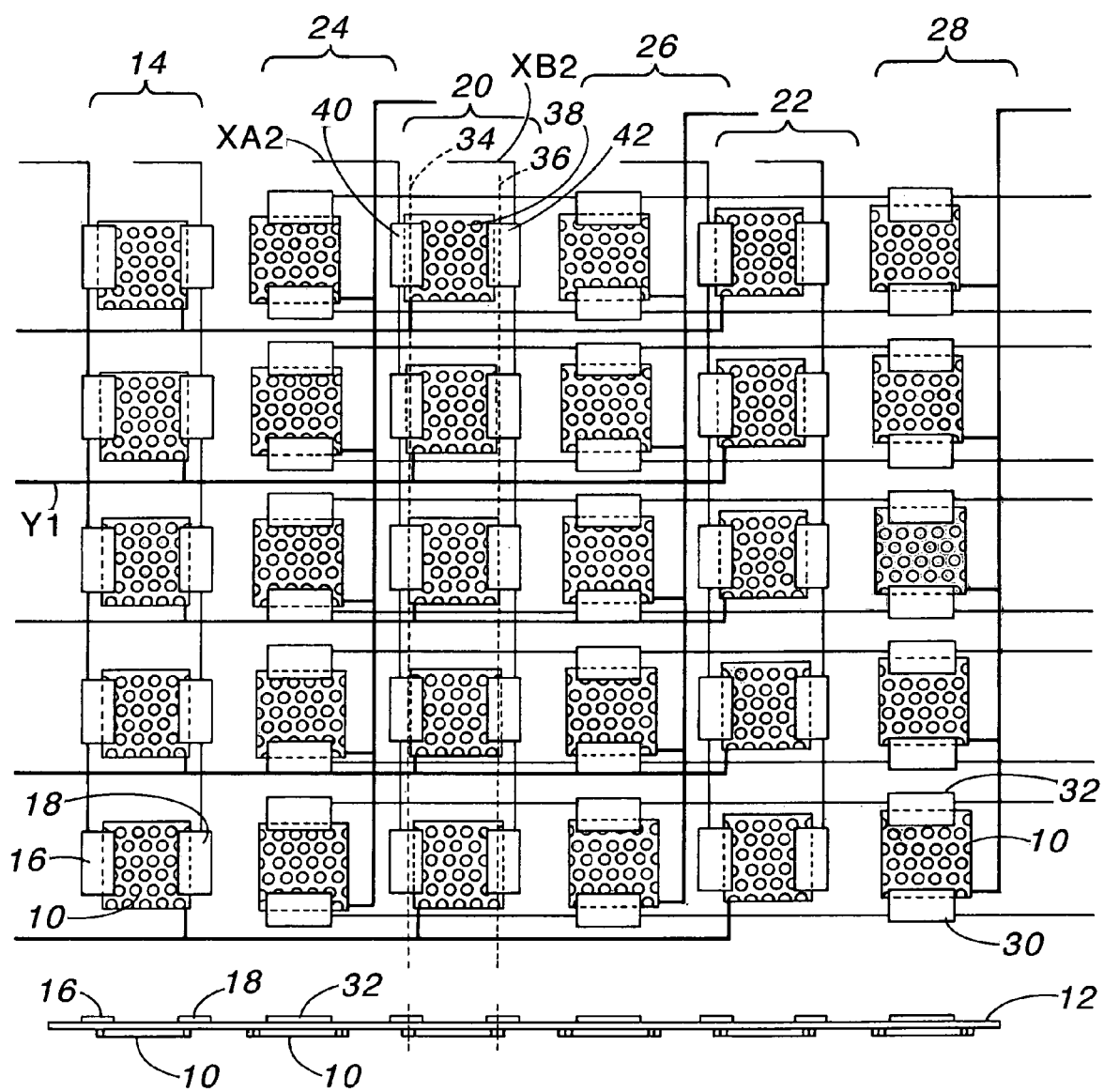

MULTICAPACITOR SENSOR ARRAY

This application claims the benefit of provisional patent application No. 60/652,864 filed Feb. 15, 2005.

BACKGROUND OF THE INVENTION

The field of the invention pertains to electrical sensors for sensing axial forces and shear forces. In particular, the invention is directed to sensing shear in one or two perpendicular directions simultaneous with sensing axial force in the third direction.

SUMMARY OF THE INVENTION

The new sensor array comprises a first plurality of conductors separated by a compressible insulator from a second plurality of conductors lying in a second plane parallel to the first plane. The second plurality of conductors are paired to partially overlap the first plurality of conductors, two by one in sets, whereby a shear force applied to one plurality of conductors relative to the other plurality of conductors in a plane parallel to the conductor array will cause capacitance between the first and second conductors to change. Sequentially sampling the two by one sets for changes in capacitance provides information on both the magnitude and direction of shear. Moreover, forces applied perpendicular to the planes of the conductor array cause the insulator to compress, thus also changing the capacitances of the two by one sets of the sensor array.

Multiplied many times over, the sensor two by one sets can sense shear and compression at any X-Y location covered by the sensor. While many electric methods may be applied to the sensor to provide a baseline capacitance and sense changes in the capacitance in response to shear and compression, the preferred embodiment below utilizes an imbalance of voltages between the paired conductors applied to a differential amplifier to sense shear magnitude and direction. Compression forces appear as an increase in peak voltage magnitude in both of the paired conductors.

BRIEF DESCRIPTION OF THE DRAWINGS

FIG. 1 is a schematic plan view of the new sensor array;

FIG. 2 is a schematic edge view of the sensor array;

DESCRIPTION OF THE PREFERRED EMBODIMENTS

Figure 3:
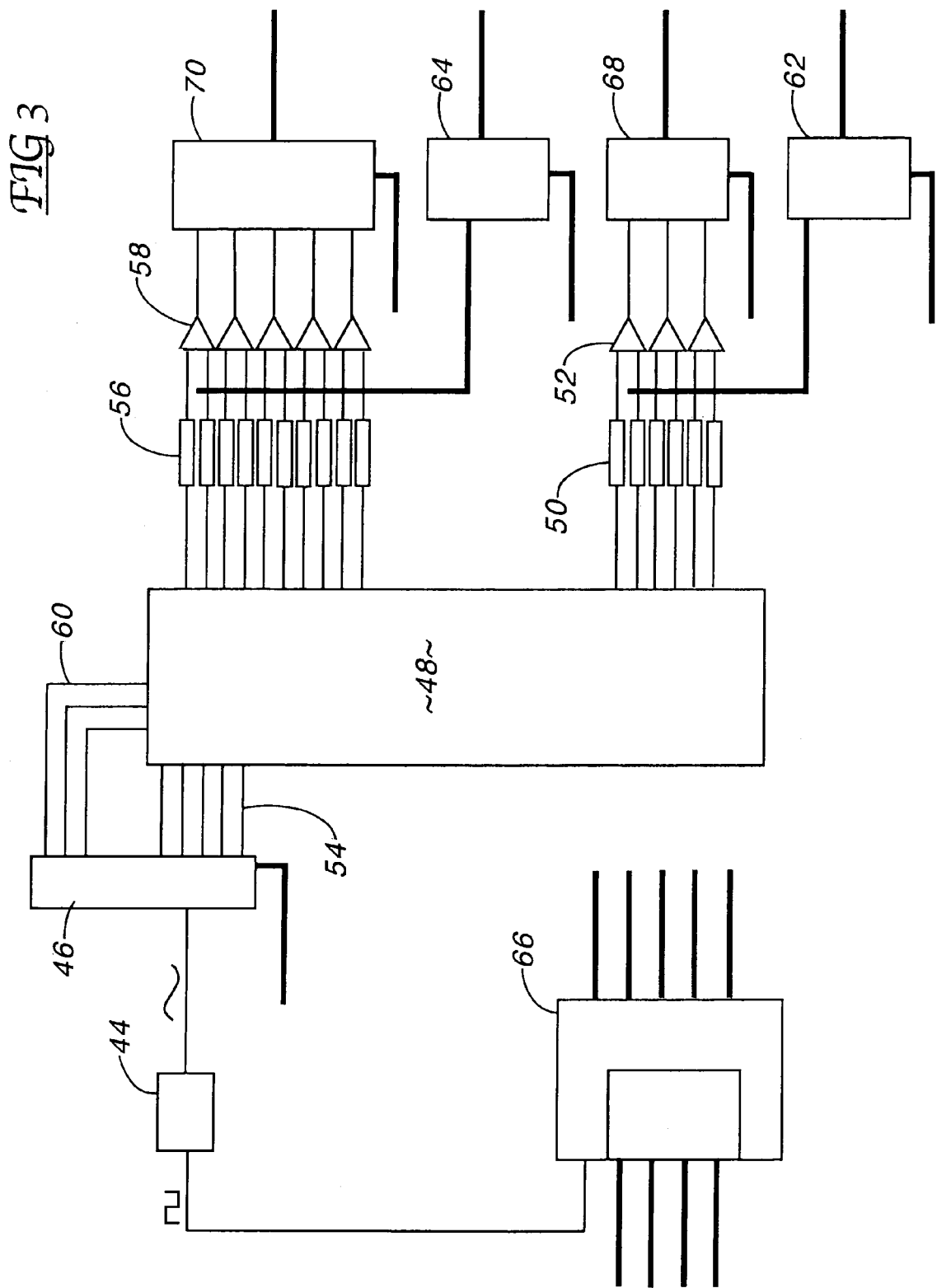
FIG. 3 is a block diagram of the electrical circuit for the sensor array.

Illustrated in FIG. 1 and FIG. 2 is a sensor array comprising a plurality of square conductive drive plates 10 all lying in the same plane. Lying immediately above the drive plates 10 is a compressible flexible dielectric material 12. Atop the dielectric 12 are conductive sense plates paired above each drive plate 10. More specifically, in FIG. 1, in the first vertical row 14 the conductive sense plates 16 and 18 at the lower left corner of the array overlap the drive plate 10 to the right and left to sense shear in the horizontal X axis, as is true of the sense plates thereabove in this vertical subset row. In a similar manner, the sense plate pairs overlap the drive plates right and left in vertical subset rows 20 and 22.

In the other vertical rows 24, 26 and 28, the sense plate pairs are located top and bottom and partially overlap the drive plates, as shown at 30 and 32 to sense shear in the vertical Y axis. Thus, in alternating vertical rows, the sense plate pairs are right and left or top and bottom and, as a consequence, in horizontal rows individual drive plate and sense plate pair sets alternate.

In a completely relaxed condition of the dielectric material, the areas of overlap of sense plate 16 and sense plate 18 over drive plate 10 are equal. If a purely compressive force perpendicular to the planes of the array is applied, the capacitance will change equally between each sense plate 16 or 18 and the drive plate 10. However, if a shear force is applied to the right or left, the drive plate 10 will move to the right or left, changing the overlaps and the effective capacitance of sense plate 16 relative to sense plate 18. The dielectric material should have very good elastic properties and low creep and hysteresis for good repeatability.

To better illustrate the sensing of shear, in FIG. 1, row 20 are a pair of vertical dashed lines 34 and 36. At the top of row 20 is a drive plate 38 shown decidedly shifted to the left relative to the vertical lines 34 and 36. As a result, the overlap of sense plate 40 is distinctly increased and the overlap of sense plate 42 distinctly decreased with corresponding changes in capacitance.

To sense the above changes in capacitance, the electrical schematic shown in FIG. 3 illustrates a suitable circuit for deriving shear in both orthogonal directions of the plane of the array and compression perpendicular to the array. A filtered 44 signal (sine wave) is applied to a multiplexer 46 to sequentially energize the drive plates 10 in the sensor array 48. In response to the application of the multiplexed drive signals, each pair of sensor plates is sampled by a pair of peak detectors and a differential amplifier. Thus, the vertical rows 14, 20 and 22 in FIG. 1 are sampled at 50 for the peak detectors and at 52 for the differential amplifiers in sequential fashion in response to drive signals 54. In a similar fashion, vertical rows 24, 26 and 28 in FIG. 1 are sampled at 56 for the peak detectors and at 58 for the differential amplifiers in response to drive signals 60. The peak detectors convert the AC signals to DC signals, thereby providing shear stress direction as well as shear stress amplitude as output from the differential amplifiers.

As shown in FIG. 3, the peak detectors 50 and 56 are multiplexed at 62 and 64, respectively, and fed to a microprocessor 66 which is also the supervisory control for the array. The differential amplifiers 52 and 58 are also multiplexed at 68 and 70, respectively, and fed to the microprocessor 66.

Referring back to FIG. 1 as an example, if Y1 is driven by a sine wave of 100 kHz and XA2 and XB2 queried, any lateral shift (shear) will cause a changed differential amplifier output because the peak detectors will have unequal outputs, and any compression will cause an increased peak voltage output from both peak detectors. Because of the array layout, forces at only one drive plate location at a time will be sensed, and, as shown in FIG. 1, every other location will sense either a horizontal or a vertical shear force, if any, when queried. The sign of the unequal output reveals the direction of shear stress. The array can be made more compact by constructing the array to have both vertical and horizontal sense plates about all four edges of a drive plate; however, additional multiplexing would be required.

Electrically, applied shear forces cause linear voltage changes in response to the shear forces. In contrast, compression forces cause non-linear voltage response because the distance between the drive plate and the paired sense plates is a factor in the denominator of the capacitor equation. This non-linearity can be corrected with a suitable counter equation or look-up tables integral with the electronics.

The sensor array can be calibrated with no forces applied, the calibration values being stored in memory. In use making measurements, the voltages can then be referenced to the calibration values. It should also be noted that although described in terms of a planar array, the sensor array with a flexible dielectric and thin flexible conductors can be applied to curved surfaces.

Figure 4:
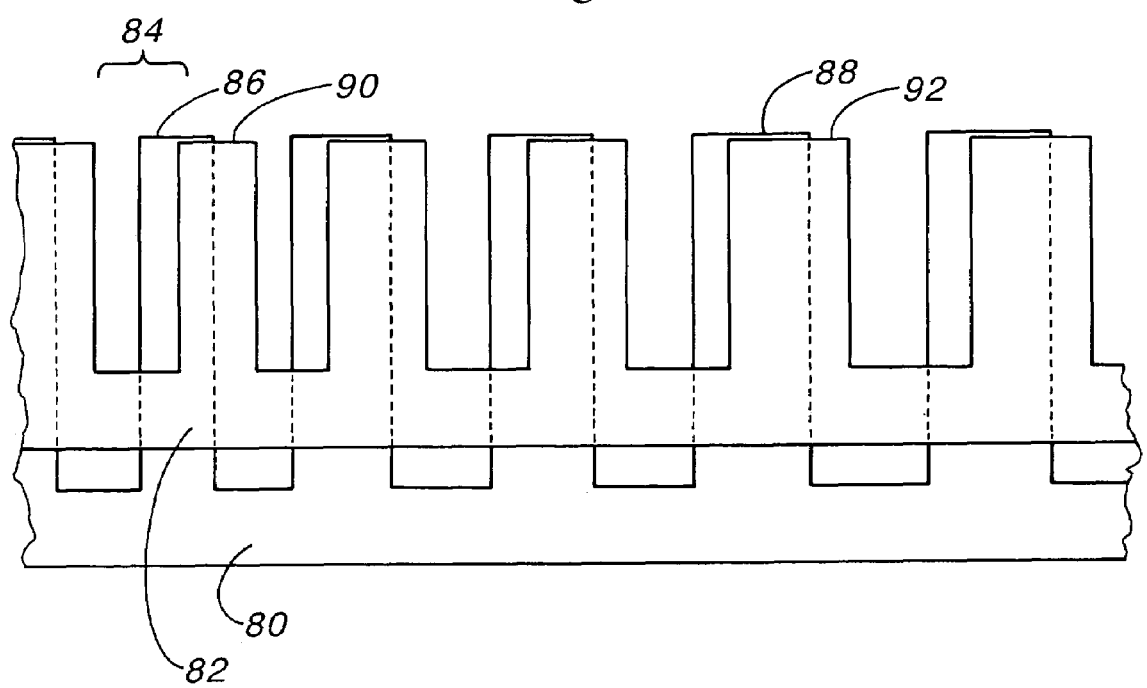
FIG. 4 is a plan view of an alternative form of the new sensor array.

The embodiment of the invention illustrated in FIG. 4 comprises a crenelated drive plate 80 in one plane and a crenelated sense plate 82 thereover with a flexible dielectric material therebetween. The capacitance depends upon the amount of overlap. The application of shear force to the drive plate 80 perpendicular to the crenelations causes the overlap and therefore the capacitance to change. If the crenelation gaps 84 equal the crenelation prongs 86 in width and the applied shear force causes the overlap to reach a minimum, up to a 100% change in capacitance can occur. This physical layout will enable one to detect very small changes in shear force. Physically, such a state is reached when the crenelations only half overlap. Further, shear will result in increasing capacitance after passing the minimum where all prong and gap widths are identical for both drive plate 80 and sense plate 82.

To avoid the capacitance change reversal above, the crenelations of the drive plate prong 86 vary in width, as shown by prong 88. In corresponding manner, the prongs 90 of the sense plate likewise vary in width, as shown by prong 92. With this geometrical change best accomplished by a graduated change in width of prong and gap along each plate, the minimum capacitance condition can be avoided within the shear strain working limits of the dielectric material.

The invention claimed is:

1. A capacitive shear sensor array comprising:
   a plurality of conductive drive plates lying in a first plane and
   a plurality of conductive sense plates lying in a second plane parallel to the first plane,
   said first and second planes separated by a dielectric;
      each of the drive plates being partially overlapped by each of a pair of the sense plates, the pair of sense plates being spaced apart over the drive plate; and
      means to energize a subset of drive plates and means to sample the capacitance of the sense plates overlapping the drive plates sequentially pair by pair,
   wherein the means to sample the capacitance of the paired sense plates includes a differential amplifier.

2. A capacitive shear sensor array comprising:
   a plurality of conductive drive plates having a plurality of crenelations lying in a first
   a plurality of conductive sense plates having a plurality of crenelations lying in a second plane parallel to the first plane, said first and second planes separated by a dielectric;
      each of the drive plates being partially overlapped by each of a pair of the sense plates, the pair of sense plates being spaced apart over the drive plate; and
   means to energize a subset of drive plates and means to sample the capacitance of the sense plates overlapping the drive plates sequentially pair by pair,
   wherein the means to sample the capacitance of the paired sense plates includes a differential amplifier.

3. The capacitive shear sensor array of claim 2 wherein the crenelations on the drive plate vary in width.

4. The capacitive shear sensor array of claim 2 wherein the crenelations on the sense plate vary in width.

5. A capacitive shear sensor array comprising:
   a plurality of conductive drive plates having prongs and lying in a first plane and
   a plurality of conductive sense plates having prongs and lying in a second plane parallel to the first plane, the drive plate prongs having crenelations and the sense plate prongs having crenelations, said first and second planes separated by a dielectric;
   said crenelations varying in width;
   each of the drive plates being partially overlapped by each of a pair of the sense plates, the pair of sense plates being spaced apart over the drive plate; and
      means to energize a subset of drive plates, and means to sample the capacitance of the sense plates overlapping the drive plates sequentially pair by pair,
      wherein the means to sample the capacitance of the paired sense splates includes a differential amplifier,
      wherein when the sense plates halfway overlap the drive plates, maximum capacitance is achieved.

* * * * *